US012611055B2

(12) United States Patent
Mani et al.

(10) Patent No.: US 12,611,055 B2
(45) Date of Patent: Apr. 28, 2026

(54) METHODS AND SYSTEMS FOR DETECTING AND TRACKING OBJECTS

(71) Applicant: DIGIT7 INDIA PRIVATE LIMITED, Richardson, TX (US)

(72) Inventors: Chithrai Selvakumar Mani, Richardson, TX (US); Venkat Shiva Pandiri, Irving, TX (US)

(73) Assignee: DIGIT7 INDIA PRIVATE LIMITED, Richardson, TX (US)

( * ) Notice: Subject to any disclaimer, the term of this patent is extended or adjusted under 35 U.S.C. 154(b) by 66 days.

(21) Appl. No.: 18/649,762

(22) Filed: Apr. 29, 2024

(65) Prior Publication Data

US 2024/0285100 A1 Aug. 29, 2024

Related U.S. Application Data

(63) Continuation-in-part of application No. 17/303,937, filed on Jun. 10, 2021, now Pat. No. 12,002,336.

(51) Int. Cl.
*A47F 9/04* (2006.01)
*G06Q 20/20* (2012.01)

(52) U.S. Cl.
CPC ........... *A47F 9/048* (2013.01); *G06Q 20/208* (2013.01)

(58) Field of Classification Search
CPC ...... A47F 9/048; G06Q 20/208; G06Q 20/18; G06Q 30/06; G06Q 30/0639; G06Q 20/20; G06N 3/08; G06V 20/52; G07G 1/0036; G07G 1/0063
See application file for complete search history.

(56) References Cited

U.S. PATENT DOCUMENTS

| | | | |
|---|---|---|---|
| 10,713,841 B1 * | 7/2020 | Pöyhtäri | G06T 17/00 |
| 11,328,576 B1 * | 5/2022 | Adam | G07C 1/10 |
| 2008/0219509 A1 * | 9/2008 | White | A63B 24/0021 |
| | | | 382/107 |
| 2020/0020113 A1 * | 1/2020 | Buibas | G06Q 30/06 |
| 2020/0184230 A1 * | 6/2020 | Liu | G06T 7/70 |

(Continued)

OTHER PUBLICATIONS

USPTO (ISA/US); International Search Report; Form PCT/ISA/210; Oct. 18, 2022.

(Continued)

*Primary Examiner* — Michael Jared Walker

(57) ABSTRACT

The improved systems and methods utilize a detection and tracking device in communication with a plurality of media acquisition devices strategically placed within a defined space, which is divided in a grid fashion such that each media acquisition device senses at least three points within the space, with adjacent media acquisition devices overlap, such that the plurality covers the entire space. Objects in the space are sensed by respective media acquisition devices, annotated with a tracking identifier, and tracked while moving therein by either the media acquisition devices or the detection and tracking device. The detection and tracking device derives input data points from each media acquisition device for projection onto a groundplot of the space, clusters the input data points from corresponding media acquisition devices into a single cluster, assigns the tracking identifier to a centroid of the cluster, and tracks the object as it moves.

14 Claims, 12 Drawing Sheets

(56)          References Cited

U.S. PATENT DOCUMENTS

| | | | | |
|---|---|---|---|---|
| 2021/0004589 A1* | 1/2021 | Turkelson | ............ | G06V 10/809 |
| 2021/0124944 A1* | 4/2021 | Datar | ...................... | G06T 7/215 |

OTHER PUBLICATIONS

USPTO (ISA/US); Notification of Transmittal of the International Search Report and the Written Opinion of the International Searching Authority; Form PCT/ISA/220; Oct. 18, 2022.

USPTO (ISA/US); Written Opinion of the International Searching Authority; Form PCT/ISA/237; Oct. 18, 2022.

Iguernaissi Rabah, Merad Djamel, Drap Pierre; People tracking in multi-camera systems: a review; ResearchGate; Multimedia Tools and Applications; Apr. 2019.

Jiang Xiaoyan, Rodner Erick, Denzler Joachim; Multi-Person Tracking-by-Detection based on Calibrated Multi-Camera Systems; University of Jena; Computer Vision Group Jena; Oct. 25, 2012.

Liem Martijn, Gavrila Dariu; Multi-person tracking with overlapping cameras in complex, dynamic environments; BMVC; 2009.

Liu Wenqian, Camps Octavia, Sznaier Mario; Multi-camera Multi-object Tracking; arXiv:1709.07065v1; Sep. 20, 2017.

Narayan Neeti, Sankaran Nishant, Arpit Devansh, Dantu Karthik, Setlur Srirangaraj, Govindaraju Venu; Person Re-identification for Improved Multi-person Multi-camera Tracking by Continuous Entity Association; University at Buffalo, SUNY; CVPR Workshop; IEEE Conference; 2017.

Niu Wei, Jiao Long, Han Dan, Wang Yuan-Fang; Real-Time Multi-person Tracking in Video Surveillance; UC Santa Barbara; Department of Computer Science; Aug. 31, 2003.

Ristani Ergys, Tomasi Carlo; Features for Multi-Target Multi-Camera Tracking and Re-Identification; Duke University; Apr. 11, 2018.

Sankaranarayanan Aswin, Veeraraghavan Ashok, Chellappa Rama; Object Detection, Tracking and Recognition for Multiple Smart Cameras; Proceedings of IEEE; vol. 96 No 10; Oct. 2008.

* cited by examiner

100

Figures 10, 11:
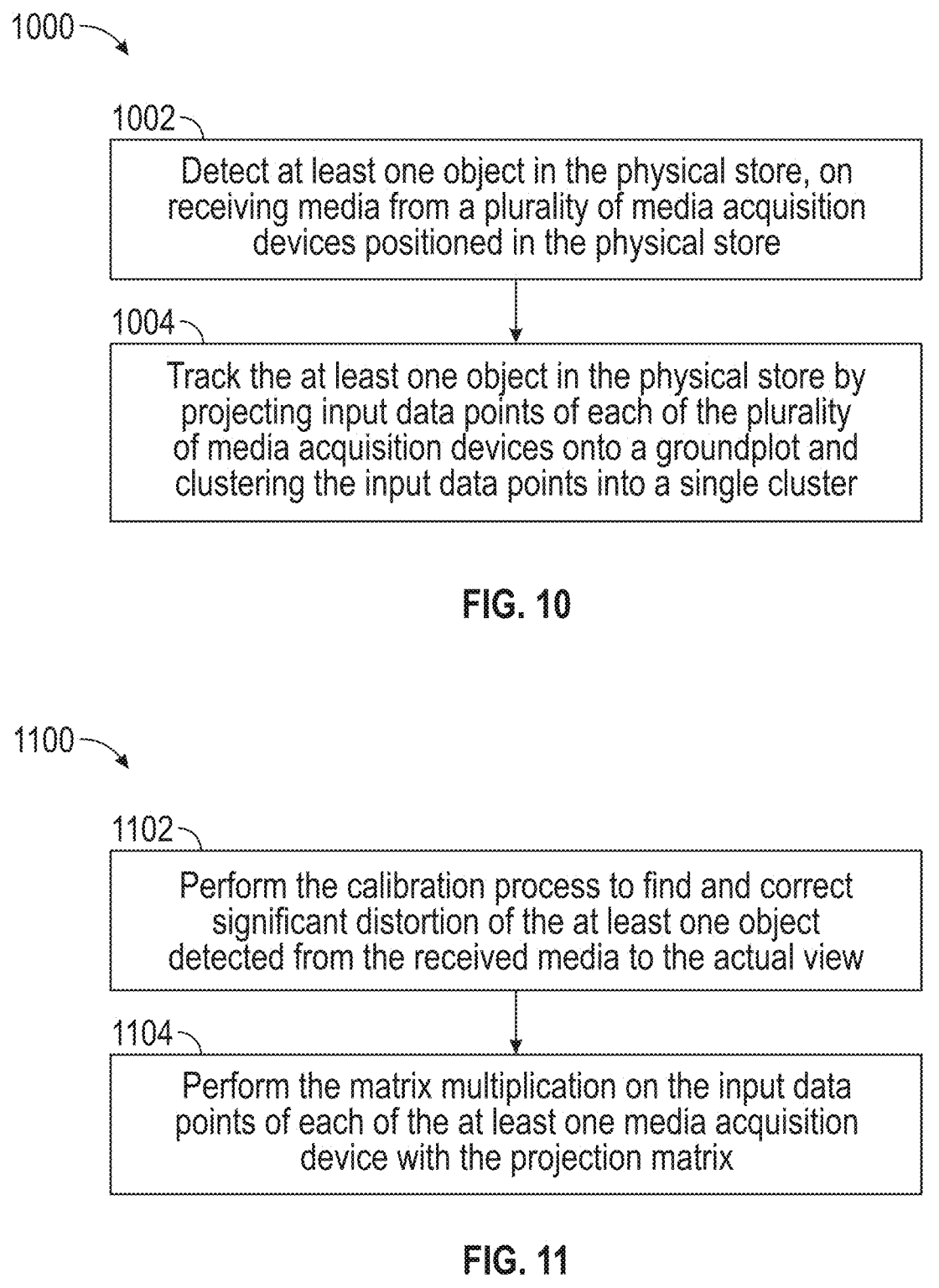

1000 —

1002 —

Detect at least one object in the physical store, on receiving media from a plurality of media acquisition devices positioned in the physical store

1004 —

Track the at least one object in the physical store by projecting input data points of each of the plurality of media acquisition devices onto a groundplot and clustering the input data points into a single cluster

Perform the calibration process to find and correct significant distortion of the at least one object detected from the received media to the actual view

1104 —

Perform the matrix multiplication on the input data points of each of the at least one media acquisition device with the projection matrix

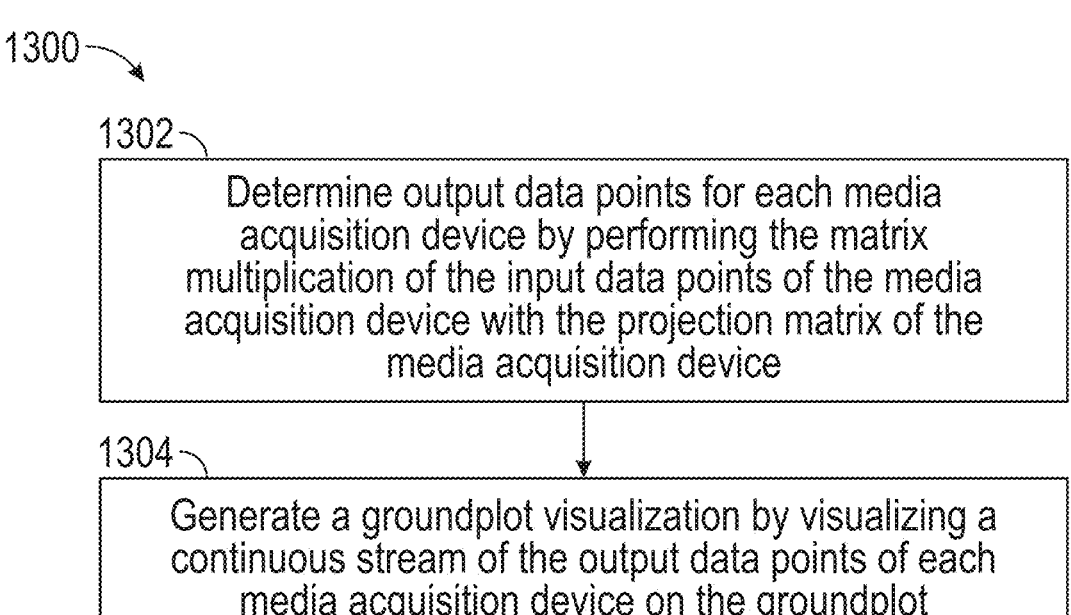

1302

Determine output data points for each media acquisition device by performing the matrix multiplication of the input data points of the media acquisition device with the projection matrix of the media acquisition device

1304

Generate a groundplot visualization by visualizing a continuous stream of the output data points of each media acquisition device on the groundplot

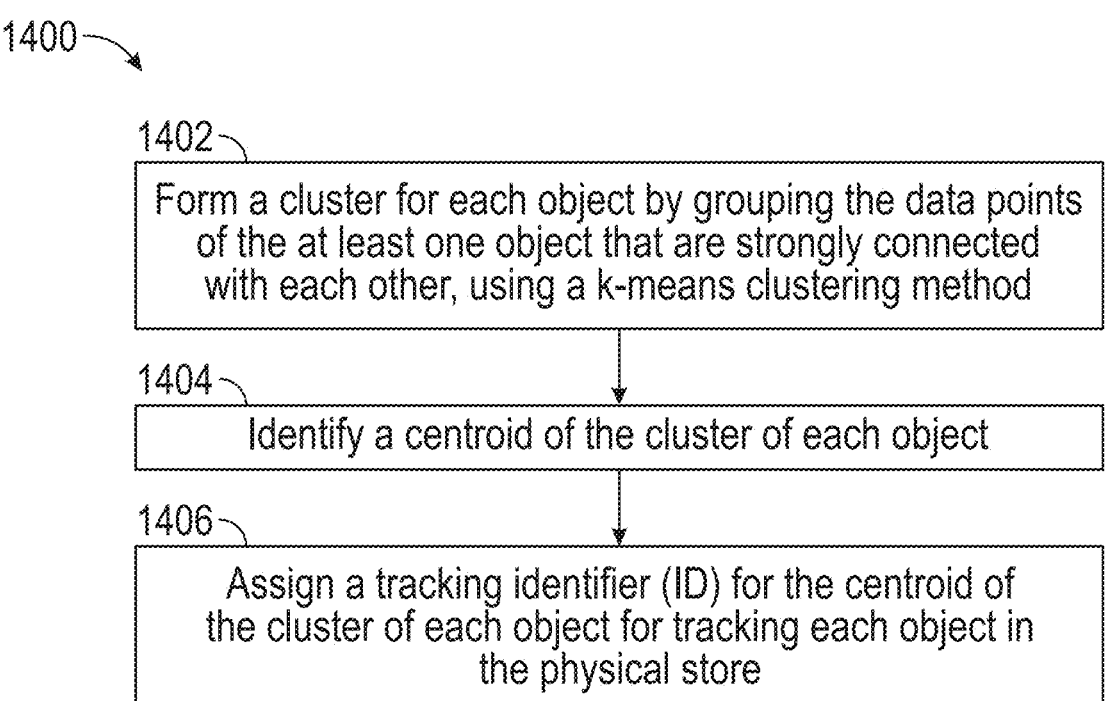

1402

Form a cluster for each object by grouping the data points of the at least one object that are strongly connected with each other, using a k-means clustering method

1404

Identify a centroid of the cluster of each object

1406

Assign a tracking identifier (ID) for the centroid of the cluster of each object for tracking each object in the physical store

FIG. 14

METHODS AND SYSTEMS FOR DETECTING AND TRACKING OBJECTS

CROSS-REFERENCE TO RELATED APPLICATIONS

This application is a continuation-in-part of U.S. patent application Ser. No. 17/303,937, filed Jun. 10, 2021 and currently pending.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

REFERENCE TO A "SEQUENCE LISTING", A TABLE, OR A COMPUTER PROGRAM LISTING APPENDIX SUBMITTED ON A COMPACT DISC AND AN INCORPORATION-BY-REFERENCE OF THE MATERIAL ON THE COMPACT DISC

Not Applicable

TECHNICAL FIELD

The embodiments herein relate to managing objects in a physical space and, more particularly, to detection and tracking of objects in a physical space.

BACKGROUND OF THE INVENTION

A smart retail store (example of a physical space) employs a cashier-less checkout method that automates the journey of customers within the retail store. Instead of a usual checkout line that involves cashiers, the cashier-less checkout method enables a retailer to detect and track the customers, checkout products intuitively as the customers pick out the products, and auto-generate a bill for the customers.

In conventional approaches, the cashier-less checkout method involves performing groundplot tracking to detect and track the customer and associated movements in the retail store. The groundplot tracking includes detecting each of the customers in the retail store using one or more depth cameras or a Light Detection and Ranging (LIDAR) system, wherein the one or more depth cameras or the LIDAR may be attached to a ceiling (for example: at least 30 feet height) by covering an entire area of the retail store. However, such a process of detecting the customers requires excessive Graphical Processing Unit (GPU) resources on multiple servers.

On detecting the customer, the groundplot tracking involves assigning a tracking identifier (ID) to each of the customers detected based on the one or more depth cameras or the LIDAR system. However, the tracking ID of the customer may not be transferred from one depth camera to another. Thus, if the depth camera has stopped operating or ha malfunctioned, then the tracking ID of the customer may be lost. In addition, a loss of the tracking ID of the customer may result in inappropriate or incorrect billing to the customer, loss of revenue, low customer satisfaction, and the like. What is needed is a system that achieves detection and tracking with accuracy using hardware that is more flexible, less costly, and consumes fewer resources.

BRIEF SUMMARY OF THE INVENTION

A method for detecting and tracking objects is provided as set out in claim 1. A system for detecting and tracking objects is provided as set out in claim 9.

The novel and unique features that are considered characteristic of the invention are set forth particularly in the appended claims.

BRIEF DESCRIPTION OF THE SEVERAL VIEWS OF THE DRAWING(S)

The invention may be more fully understood by studying the detailed description of the embodiments of the invention in conjunction with the accompanying drawings, wherein:

FIGS. 1*a*, 1*b*, and 1*c* depict a tracking system, according to embodiments as disclosed herein;

FIG. 10 is a flow diagram depicting a method for detecting and tracking the objects in the physical space;

FIG. 11 is an example diagram depicting a method for projecting the input data points of the media acquisition devices onto the groundplot;

FIG. 13 is a flow diagram depicting a method for performing a matrix multiplication; and FIG. 14 is a flow diagram depicting a method for performing a clustering to assign the tracking ID for each object.

The above figures are provided for illustration and description only, and are not intended to limit the disclosed invention. Use of the same reference number in multiple figures is intended to designate the same or similar parts or elements.

DETAILED DESCRIPTION OF THE INVENTION

Figure 1A:
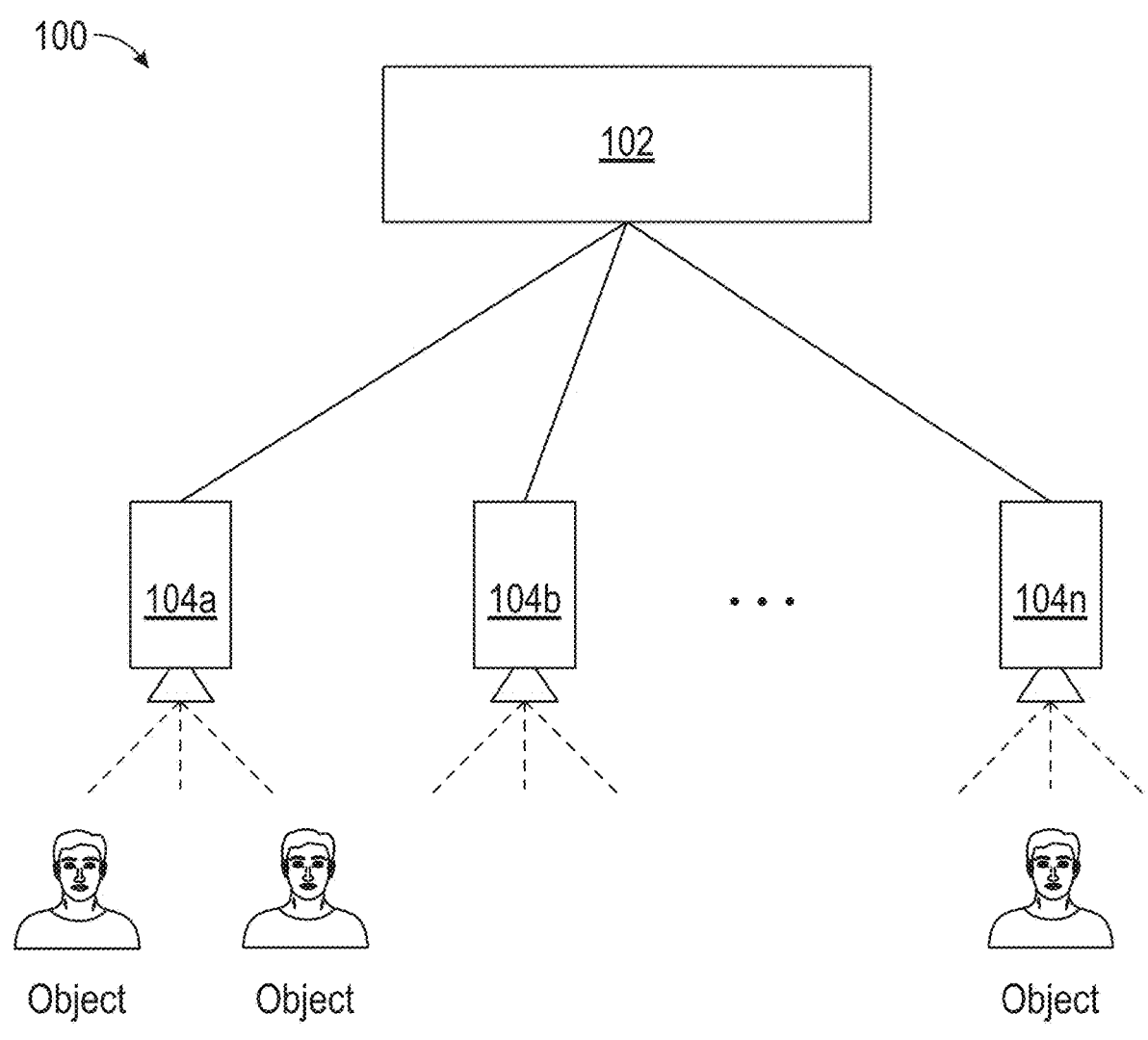
Figure 1B:
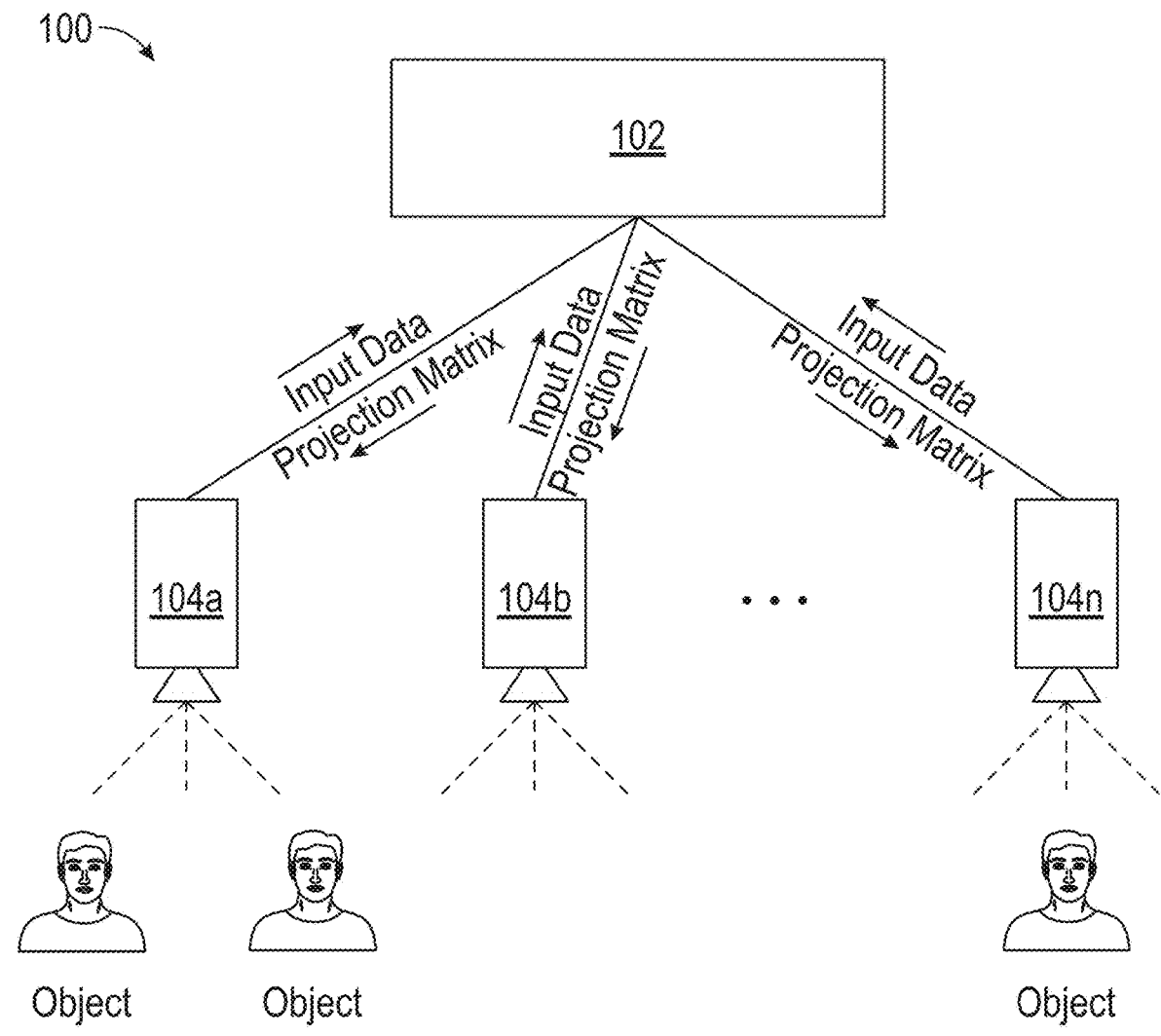
Figure 1C:
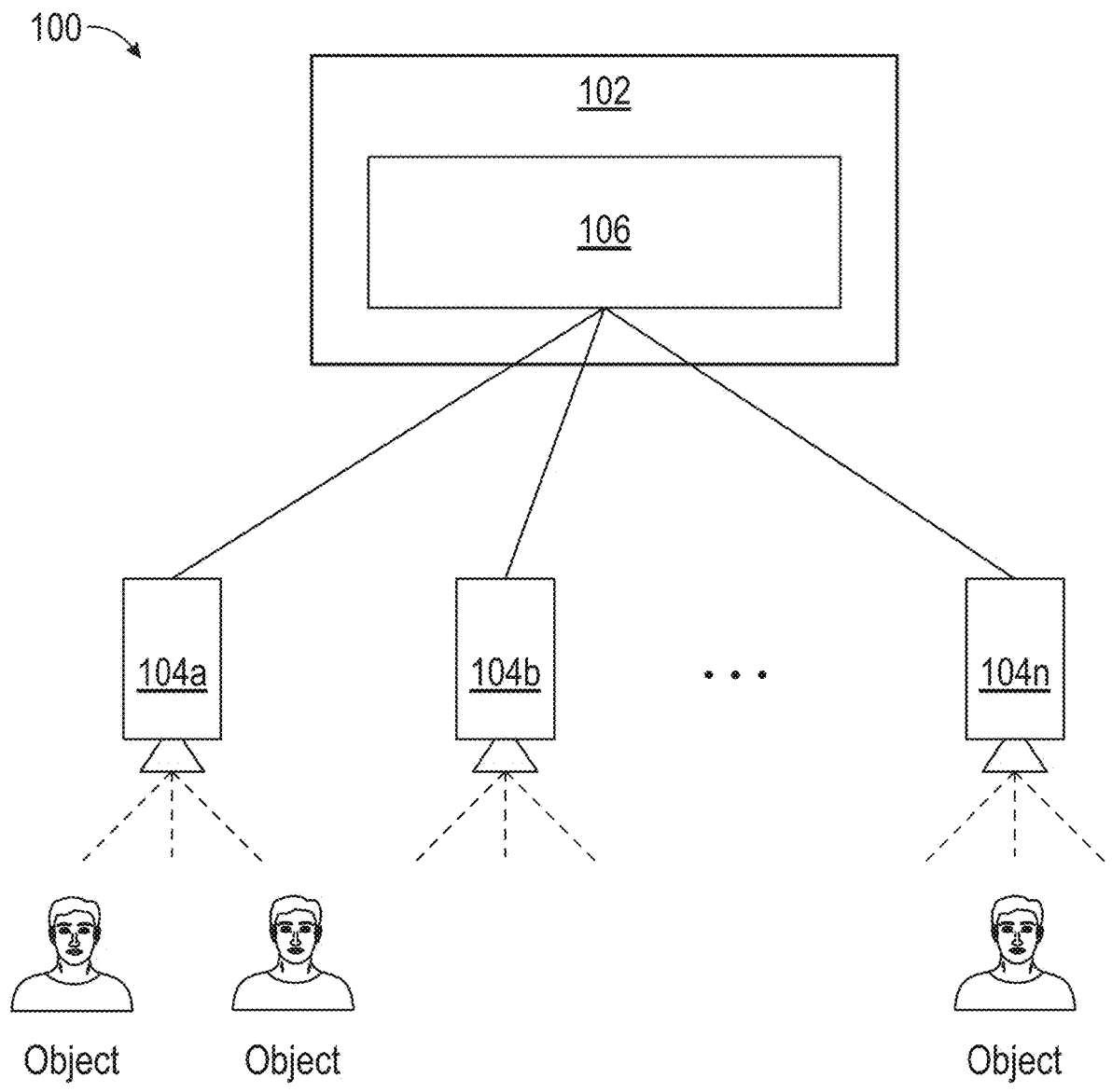

FIGS. 1*a*, 1*b*, and 1*c* depict a first embodiment of the tracking system 100, configured and adapted to detect and track objects in a physical space. For example but not limitation, the system is useful for detecting and tracking objects within a cashier-less store, or to provide an automated authentication of objects within a warehouse space or the like as they move about. Other non-limiting examples of the physical space include a retail store, a grocery store, a convenience store, a warehouse, a storage center, or any other space wherein objects are moved about and must be accurately tracked in effectively approximately real time. Other examples of a physical space include airports, offices, factory units, medical centers, restaurants, entertainment venues, or the like, wherein objects must be detected and tracked. It is understood that the physical space may include a combination of above spaces where the objects have to be detected and tracked. Examples of objects include humans, animals, or representations thereof, or some combination thereof.

As depicted in FIG. 1a, the tracking system 100 includes a detection and tracking device 102, in communication with media acquisition devices (104a-104n). For example but not limitation, the detection and tracking device 102 and the media acquisition devices (104a-104n) may be connected with each other using a communication network including a wired network, a value-added network, a wireless network, a satellite network, or some combination thereof. Examples of the wired network may be, but are not limited to, a Local Area Network (LAN), a Wide Area Network (WAN), Ethernet, and the like. Examples of the wireless network may be, but are not limited to, a cellular network, a wireless LAN (Wi-Fi), Bluetooth, ZigBee, Wi-Fi Direct (WFD), Ultra-wideband (UWB), infrared data association (IrDA), near field communication (NFC), and the like. In another example, the media acquisition devices (104a-104n) may be connected with each other directly (for example: via a direct communication, via an access point, and so on) or through the communication network.

The detection and tracking device 102 referred herein may utilize, but is not limited to, a cloud computing device (can be a part of a public cloud or a private cloud), a server, a database, an electronic device, and the like, or some combination thereof. The server may be at least one of a stand alone server, a server on a cloud, or the like. The electronic device may be, but is not limited to, a personal computer, a notebook, a tablet, a desktop computer, a laptop, a handheld device, a mobile device, and the like. Also, the detection and tracking device 102 may be at least one or some combination of, a microcontroller, a processor, a System on Chip (SoC), an integrated circuit (IC), a microprocessor-based programmable consumer electronic device, and the like. In an example, the detection and tracking device 102 may be positioned on premises of the physical space or may be remotely located.

The detection and tracking device 102 is adapted to control positions and working of the media acquisition devices (104a-104n). The detection and tracking device 102 is further adapted to divide (or partition) an area of the physical space into a plurality of points in a grid-like fashion. The media acquisition devices (104a-104n) are strategically positioned within in the physical space based on the gridded area. The plurality of points may be fixed or variable points. Each media acquisition device (104a-104n) is positioned such that it has at least three points in its field of view/coverage for sensing (or viewing) objects. The detection and tracking device 102 selects at least three points for each media acquisition device (104a-104n) randomly. The selected at least three points for the media acquisition device (104a) may or may not overlap with the at least three points of the other media acquisition devices (104b-104n). Examples of the media acquisition devices (104a-104n) include, but are not limited to, a camera, an imaging sensor, a digital camera, a thermal camera, a depth camera, an RGB camera, a Light Detection and Ranging (LIDAR), and the like, or some combination thereof.

The detection and tracking device 102 allows the media acquisition devices (104a-104n) to be deployed in the physical space in such a way that at least one media acquisition device covers a defined portion of the area of the physical space by having the at least three points in its field of view. Thus, the plurality of the media acquisition devices (104a-104n) covers an entire area of the physical space, such that if an object is not detected by one media acquisition device 104a, at least one other media acquisition device (104b-104n) may detect the object. Thus, tracking of the object in the physical space may not be lost.

In an example, the media acquisition devices (104a-104n) may be positioned in the physical space by hinging the media acquisition devices (104a-104n) to a ceiling of the physical space in order to cover the at least three points of the physical space. The media acquisition devices (104a-104n) may be positioned on the ceiling of the physical space to avoid occlusions or obstructions. In another example, the media acquisition devices (104a-104n) may be positioned on walls of the physical space to cover the at least three points of the physical space. The media acquisition devices (104a-104n) may be positioned at any suitable angles on the ceiling or the walls to cover the at least three points of the physical space. The media acquisition devices (104a-104n) may be positioned next to each other with some amount of overlap between the adjacent media acquisition devices (104a-104n). One of ordinary skill will appreciate that the media acquisition devices may be deployed in any other manner in the physical space to achieve the above stated goal Each media acquisition device (104a-104n) is adapted to capture media of the points of the physical space it is positioned to sense, and detect an object in the captured media. Examples of the media may be, but are not limited to, an image, picture, video, and the like. The detection and tracking device 102 trains the media acquisition devices (104a-104n) to detect the at least one object in the captured media using custom training methods such as, but are not limited to, a YOLO v4 training method, a computer vision (CV) method, and so on.

For training the media acquisition devices (104a-104n), the detection and tracking device 102 captures media with multiple objects present as a training dataset and generates annotations for the multiple objects. The annotations include information about the detected head of each of the multiple objects. The detection and tracking device 102 uses the custom training method to train the media acquisition devices (104a-104n) based on the annotations. Each trained media acquisition device (104a-104n) detects the head from the captured media and tags the detected head as an object of interest. Each media acquisition device (104a-104n) provides the media including the detected at least one object of interest to the detection and tracking device 102. In an example, the media may be an image frame including the detected at least one object. Alternatively, the media acquisition devices (104a-104n) provide the captured media to the detection and tracking device 102, and the detection and tracking device 102 detects the objects in the captured media instead.

On detecting one or more objects of interest in each media, the detection and tracking device 102 tracks the objects by assigning a tracking identifier (ID) for the at least one object. For tracking each object, the detection and tracking device 102 derives and projects input data points corresponding to each media acquisition device (104a-104n) onto a groundplot, clusters the input data points corresponding to each media acquisition device (104a-104n) into a single cluster, and assigns the tracking ID to a centroid of the cluster, wherein the single centroid denotes the object.

For deriving the input data points from each media acquisition device (104a-104n), the detection and tracking device 102 identifies a first bounding box and a second bounding box corresponding to the detected object from the media received from the media acquisition device (104a-104n). The media may be the frame enclosing the object. The bounding box may be a box with a smallest measure, which include pixel coordinates of the object. In an example, the first bounding box and the second bounding box may be a top left box and a bottom right box, respectively, of the media/frame that includes at least one object. The detection and tracking device 102 creates an average bounding box based on an average of coordinates of the first bounding box and the second bounding box. The detection and tracking device 102 derives the pixel coordinates of the average bounding box as the input data points of the at least one object corresponding to the media acquisition device (104a-104n). Thus, the input data points, derived corresponding to each media acquisition device (104a-104n), represent the pixel coordinates of the at least one object of interest detected by the corresponding media acquisition device (104a-104n).

Consider an example scenario, wherein the detection and tracking device 102 receives the media/image frame from a depth camera (an example of the media acquisition device) of resolution 1980×1080. The image frame includes the object detected with the first bounding box of 200×400 (top left of the image frame) and the second bounding box of 400×600. In such a scenario, the detection and tracking device 102 generates the average bounding box of 300×500 based on the average of the first bounding box and the second bounding box. The detection and tracking device 102 determines the pixel coordinates of the average bounding box as the input data points of the depth camera.

On deriving the input data points of each media acquisition device (104a-104n), the detection and tracking device 102 projects the input data points of each acquisition device (104a-104n) onto the groundplot. The groundplot may be a hyperplane.

The detection and tracking device 102 projects the input data points of each media acquisition device (104a-104n) onto the groundplot using a calibration process and matrix multiplication. The calibration process may be a process of finding and correcting significant distortion of the at least one object detected from the received media of each media acquisition device (104a-104n) to an actual view. The actual view depicts how the at least one object looks on the groundplot. Before performing the calibration process, the detection and tracking device 102 ensures that at least one of the media acquisition devices (104a-104n) covers the at least three points of the physical space (that is, each point is not required to be covered by all the media acquisition devices [104a-104n]). The detection and tracking device 102 performs the calibration process on ensuring that the at least three points of the physical space has been covered by each of the media acquisition devices (104a-104n). Calibration is performed for each media acquisition device (104a-104n), for each point in the physical space.

For performing the calibration process, a calibration object is placed in a first point of the physical space. The detection and tracking device 102 initially obtains the media from the respective media acquisition device (104a-104n) with a view of the first point, for a predefined time period to obtain a series of media. In an example, the detection and tracking device 102 defines the time period based on a number of input data points of the media acquisition device (104a-104n) required at each point in the space for finding and correcting the distortion of the at least one object. The number of data points required is a predefined value based upon statistical analysis of the resulting deviations in the averaging of the input data points received. Consider an example scenario, wherein the detection and tracking device 102 requires 200 input data points from each of the plurality of points for accurately finding and correcting the distortion of the object. In such a scenario, the detection and tracking device 102 defines the time period as 10 seconds, as 20 data points may be captured per second. This series of media received from each media acquisition device (104a-104n) with a view of this first point establishes a series count (200 in the example).

On obtaining the media of the first point from a respective media acquisition device 104a covering the point, the detection and tracking device 102 detects the input data points from the media of the corresponding media acquisition device 104a obtained at the first point. The input data points of the respective media acquisition device (104a-104n) detected at the first point represent the calibration object detected at the first point of the physical space. The detection and tracking device 102 maps the input data points of the respective media acquisition device (104a-104n) detected at the first point onto the groundplot. Data points on the ground plot corresponding to the input data points of the respective media acquisition device (104a-104n) may be hereinafter referred as target data points of the respective media acquisition device (104a-104n).

The detection and tracking device 102 creates a projection matrix for this point in space for each media acquisition device (104a-104n) with a view of this first point. The projection matrix created for the media acquisition device (104a-104n) acts a bridge between the input data points of the media acquisition device (104a-104n) detected at the particular points of the physical space and the target data points of the respective media acquisition device (104a-104n) mapped on the groundplot. The detection and tracking device 102 creates the projection matrix for each media acquisition device as:

$$\text{projection matrix} = (O \cdot IT) \cdot INV(I \cdot IT)$$

wherein "I" is an input matrix representing the input data points of the corresponding media acquisition device detected at the particular point, "O" is an output matrix representing the target data points of the respective media acquisition device mapped onto the groundplot, and "IT" is a transpose of the input matrix.

Consider an example scenario, wherein the input data points of the media acquisition device 104a are (523.45, 438.22), and (511.79, 224.11) and the target data points of the media acquisition device 104a are (9, 1.5) and (10.5, 1.5). In such a scenario the detection and tracking device 102 constructs the input matrix representing the input data points of the media acquisition device 104a as:

$$\text{input matrix } I = \begin{bmatrix} 523.45 & 438.22 \\ 511.79 & 224.11 \end{bmatrix}$$

The detection and tracking device 102 constructs the output matrix depicting the target data points of the media acquisition device 104*a* as:

$$\text{output matrix } O = \begin{bmatrix} 9 & 10.5 \\ 1.5 & 1.5 \end{bmatrix}$$

The detection and tracking device 102 constructs the transpose matrix of the input matrix as:

$$\text{transpose matrix } IT = \begin{bmatrix} 523.45 & 511.79 \\ 438.22 & 224.11 \end{bmatrix}$$

The detection and tracking device 102 determines the projection matrix for the media acquisition device 104*a* as:

$$\text{projection matrix} = \left( \begin{bmatrix} 9 & 10.5 \\ 1.5 & 1.5 \end{bmatrix} \cdot \begin{bmatrix} 523.45 & 511.79 \\ 438.22 & 224.11 \end{bmatrix} \right) \cdot$$
$$INV\left( \begin{bmatrix} 523.45 & 438.22 \\ 511.79 & 224.11 \end{bmatrix} \cdot \begin{bmatrix} 523.45 & 511.79 \\ 438.22 & 224.11 \end{bmatrix} \right)$$

which becomes:

$$\text{projection matrix} = \begin{bmatrix} 0.031381912450853 & -0.014511541984796 \\ 0.0040341702484333 & -0.0011951902470591 \end{bmatrix}$$

When all media acquisition devices (104*a*-104*n*) with a view of the first point have received a projection matrix for this point, the calibration process continues by moving the calibration object to the next point in the physical space. At the next point the above calibration steps are performed again for all media acquisition devices (104*a*-104*n*) with a view of this next point to create a projection matrix for these media acquisition devices for this point. This process continues until all points in the physical space have been addressed, and each media acquisition device (104*a*-104*n*) has received a projection matrix for each point in the physical space that it can view.

On creating the projection matrix for each of the media acquisition devices (104*a*-104*n*) after calibration, the detection and tracking device 102 determines output data points for each media acquisition device (104*a*-104*n*) by performing the matrix multiplication. The matrix multiplication performed for each media acquisition device (104*a*-104*n*) includes multiplication of the projection matrix with the input matrix including the input data points of the respective media acquisition device (104*a*-104*n*). The detection and tracking device 102 determines the output data points for each media acquisition device (104*a*-104*n*) as:

$$\text{output data points} = (\text{projection matrix}) \cdot (\text{input matrix})$$

Consider an example scenario, wherein the projection matrix determined for the media acquisition device 104*a* and the input matrix depicting the input data points of the media acquisition device 104*a* are:

$$\text{projection matrix} = \begin{bmatrix} 0.031381912450853 & -0.014511541984796 \\ 0.0040341702484333 & -0.0011951902470591 \end{bmatrix}$$

-continued
$$\text{input matrix} = \begin{bmatrix} 515.28 \\ 433.56 \end{bmatrix}$$

In such a scenario, the detection and tracking device 102 determines the output data points for the media acquisition device 104*a* as:

$$\text{output data points} =$$
$$\left( \begin{bmatrix} 0.031381912450853 & -0.014511541984796 \\ 0.0040341702484333 & -0.0011951902470591 \end{bmatrix} \right) \cdot \left( \begin{bmatrix} 515.28 \\ 433.56 \end{bmatrix} \right)$$

which becomes:

$$\text{output data points} = \begin{bmatrix} 9.878847704747379 \\ 1.5605405620977675 \end{bmatrix}$$

Figure 8:
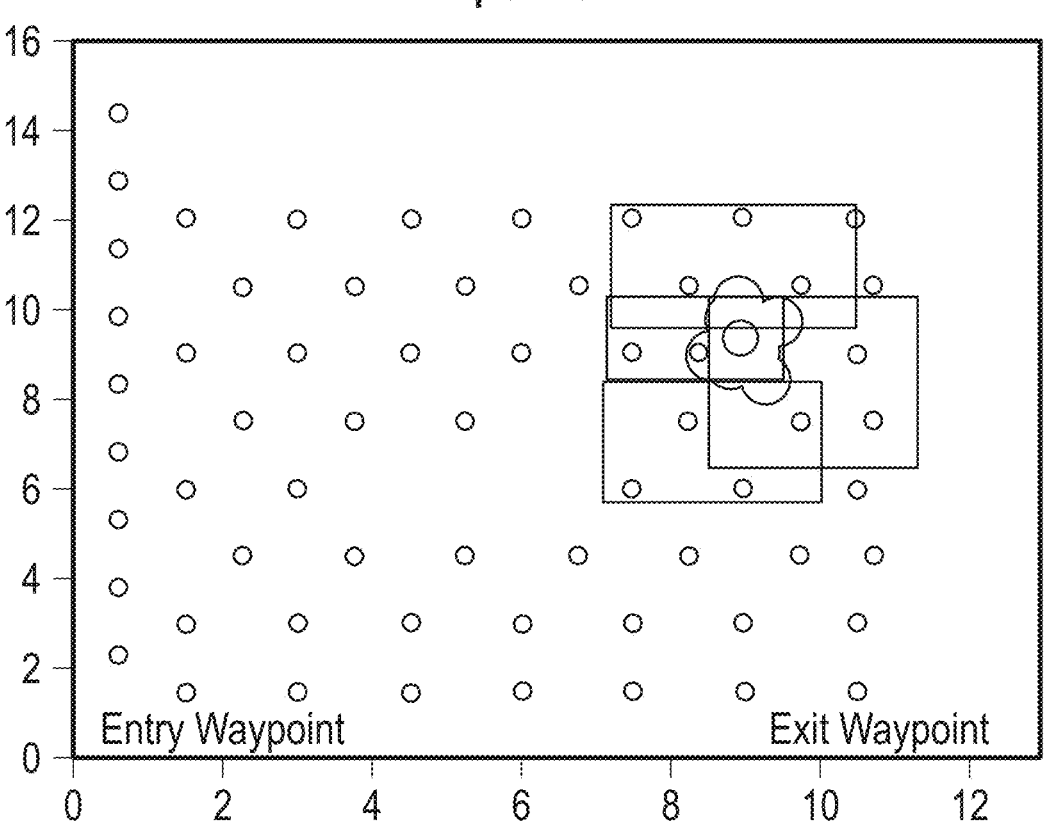
FIG. 8 depicts a groundplot visualization.

The output data points (i.e., 9.878847704747379 and 1.5605405620977675) may represent projection of the input data points acquired by the media acquisition device 104*a*. The output data points may be one of the projections of the object detected in the physical space like the data points of the groundplot visualization (as depicted in FIG. 8).

The detection and tracking device 102 visualizes (projects) the output data points of each media acquisition device (104*a*-104*n*) on the groundplot. The visualization of the output data points of each media acquisition device (104*a*-104*n*) on the groundplot may depict data points of the same object strongly associated with each other on the groundplot.

On visualizing the output data points of each media acquisition device (104*a*-104*n*) on the groundplot, the detection and tracking device 102 performs a clustering to assign the tracking ID for each object. For assigning the tracking ID to each object, the detection and tracking device 102 forms the cluster by grouping the data points of the same object on the ground plot that have been strongly associated with each other. The detection and tracking device 102 forms the cluster using a K-means clustering method of a neural network. Examples of the neural network may be, but are not limited to, a machine learning network, a convolutional neural network (CNN), a deep neural network (DNN), a recurrent neural network (RNN), a restricted Boltzmann Machine (RBM), a deep belief network (DBN), a bidirectional recurrent deep neural network (BRDNN), generative adversarial networks (GAN), a deep Q-networks, an Artificial Intelligence (AI) model, a regression based neural network, and so on.

The neural network includes a plurality of nodes, which may be arranged in layers. Examples of the layers may be, but are not limited to, a convolutional layer, an activation layer, an average pool layer, a max pool layer, a concatenated layer, a dropout layer, a fully connected layer, a SoftMax layer, and so on. A topology of the layers of the neural network may vary based on the type of the correlation module. In an example, the correlation module may include an input layer, an output layer, and a hidden layer. The input layer receives an input (for example: the points of the object having the strong connection associated with each other) and forwards the received input to the hidden layer. The hidden layer transforms the input received from the input layer into a representation, which can be used for generating the output in the output layer. The hidden layers extract useful low level features from the input, introduce non-linearity in the network, and reduce a feature dimension to make the features equivariant to scale and translation. The nodes of the layers may be fully connected via edges to the nodes in adjacent layers. The input received at the nodes of the input layer may be propagated to the nodes of the output layer via an activation function that calculates the states of the nodes of each successive layer in the network based on coefficients/weights respectively associated with each of the edges connecting the layers. The input layer, the hidden layer, and the output layer may perform the respective functions based on the K-means clustering method.

On forming the cluster, the detection and tracking device 102 identifies a centroid of the cluster. The centroid of the cluster may be the single point representing the object. The detection and tracking device 102 assigns the tracking ID to the centroid/object when the data points of the object on the groundplot appear near the vicinity of an entry point of the physical space, or from some other reference point.

On assigning the tracking ID to each object, the detection and tracking device 102 may track the movements of each object in the physical space by following the respective tracking ID as it moves in the processed media from one media acquisition device to another. In an example, if the object is a customer and the physical space is a retail store, the detection and tracking device 102 may track the customer, determine the products picked up by the customer, and auto-generate a bill for the customer based on the tracking ID of the customer and the media of the customer received from the media acquisition devices (104a-104n).

The detection and tracking device 102 may display the detected objects and the associated tracking ID to an authorized operator of the physical space if the detection and tracking device 102 is positioned on premises of the physical space. Alternatively, the detection and tracking device 102 may provide information about the detected objects and the associated tracking ID to a hand-held or fixed display device used by the authorized operator of the physical space through a communication network.

In an embodiment, as depicted in FIG. 1b, each media acquisition device (104a-104n) may be adapted to perform at least one intended action of the detection and tracking device 102. The at least one action may include capturing the media of its associated point, determining the one or more objects from the media, and projecting the input data points of each object onto the groundplot by creating the projection matrix. The media acquisition device (104a-104n) may be adapted to perform the at least one action as previously described for the detection and tracking device 102, and thus a repeated description thereof is omitted for conciseness.

The media acquisition device (104a-104n) communicates the created projection matrix to the detection and tracking device 104. The detection and tracking device 102 may receive the projection matrix of each media acquisition device (104a-104n) and the associated input data points and determines the output data points for each media acquisition device (104a-104n) by performing the matrix multiplication of the projection matrix with the respective input data points. The detection and tracking device 102 projects the continuous stream of the output data points of each media acquisition device (104a-104n) onto the groundplot. The detection and tracking device 102 clusters the data points of the same object and assigns the tacking ID to the object.

As depicted in FIG. 1c, the detection and tracking device 102 can be a dedicated computing device 106. The dedicated computing device 106 may be positioned on-premises of the physical space to detect and track the objects therein. In an example, the dedicated computing device 106 may be a cost effective and power-efficient embedded AI computing device. The dedicated computing device 106 may include one or more of: processors, a memory, storage, Input/Output (IO) ports, and so on, adapted to detect and track the objects in the physical space as described above. The one or more processors of the dedicated computing device 106 may be a general purpose processor, such as a central processing unit (CPU), an application processor (AP), or the like, a visual processing unit (VPU), and/or an AI-dedicated processor such as a neural processing unit (NPU), or the like, or some combination thereof.

The dedicated computing device 106 may be adapted to detect and track the objects within the physical space like the detection and tracking device 102 as described above, and thus a repeated description thereof is omitted for conciseness.

FIGS. 1a, 1b, and 1c depict exemplary blocks of the tracking system 100, but this is not intended to be limiting. In other embodiments the tracking system 100 may include fewer or greater number of blocks. Further, the labels or names of the blocks are used only for illustrative purpose and do not limit the scope of the embodiments herein. One or more blocks can be combined to perform same or substantially similar function in the tracking system 100.

Figure 2:
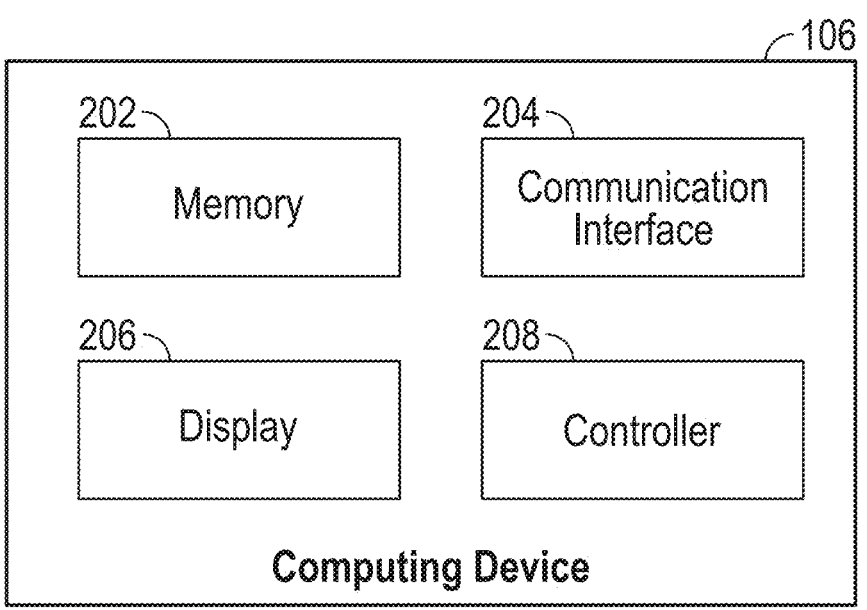
FIG. 2 is an example block diagram depicting components of the detection and tracking device for detecting and tracking objects within a physical space.

FIG. 2 is an example block diagram depicting components of the detection and tracking device 102. In this embodiment the detection and tracking device 102 includes a computing device 106 having a memory 202, a communication interface 204, a display 206, and a controller 208. The detection and tracking device 102 may also include Input/Output (IO) ports, communication ports, signal processing circuitries, and the like (not shown) to facilitate communication.

Figure 3:
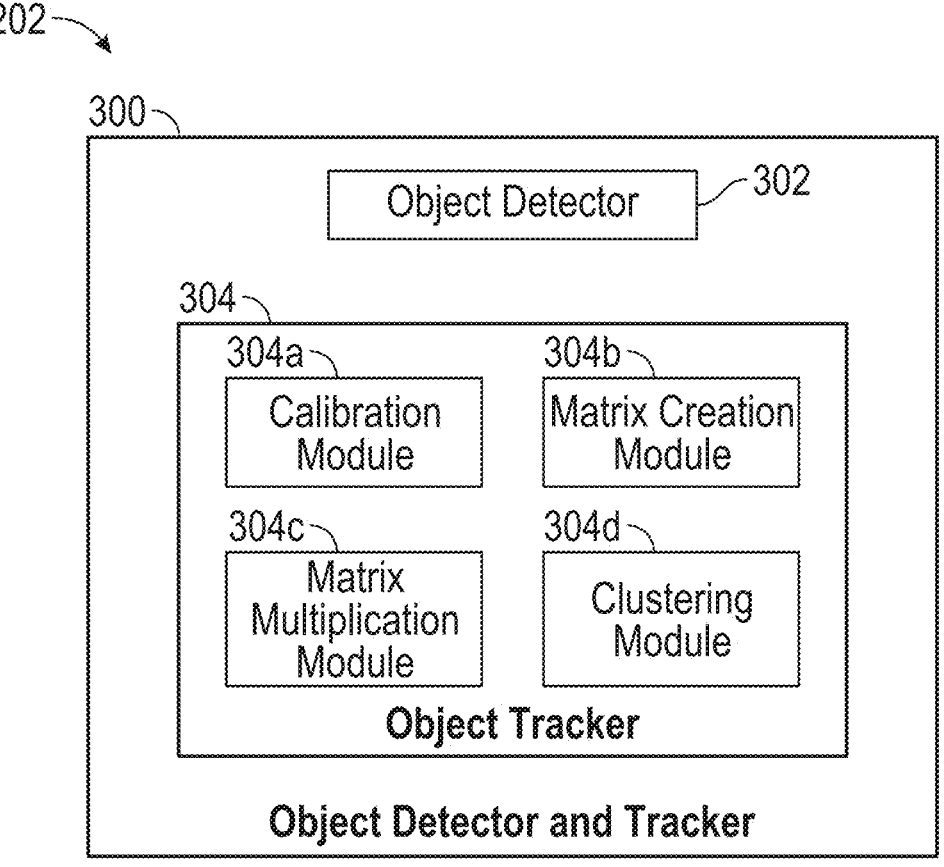
FIG. 3 depicts an object detection and tracker performable in the detection and tracking device to detect and track the objects within the physical space.

The memory 202 is adapted to store information about the media acquisition devices (104a-104n) deployed in the physical space, the detected objects, the tracking ID of the objects, and the like. Referring to FIG. 3, the memory 202 may also store an object detector and tracker 300 executable program instructions, which may be executed by the controller 208 for detecting and tracking the objects present within the physical space. Examples of the memory 202 may be, but are not limited to, NAND, embedded Multimedia Card (eMMC), Secure Digital (SD) cards, Universal Serial Bus (USB), Serial Advanced Technology Attachment (SAT A), solid-state drive (SSD), and the like, or some combination thereof. Further, the memory 202 may include one or more computer-readable storage media and/or one or more non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 202 may, in some examples, be considered a non-transitory storage medium. The term "non-transitory" may indicate that the storage medium is not embodied in a carrier wave or a propagated signal. However, the term "non-transitory" should not be interpreted to mean that the memory is non-movable. In certain examples, a non-transitory storage medium may store data that can, over time, change (e.g., in Random Access Memory [RAM] or cache).

The communication interface 204 is adapted to enable the detection and tracking device 102 to communicate with at least one of, the media acquisition devices (104a-104n), the device used by the authorized operator, and the like, using communication methods supported by the communication network.

The display 206 is adapted to enable the authorized operator to interact with the detection and tracking device 102. The display 206 may also be configured to provide outputs received from the controller 208 to the authorized operator. Example of the outputs may be, but are not limited to, the detected objects in the physical space, the tracking ID of the detected objects, the path taken by the detected objects, and the like.

The controller 208 may be at least one of, but is not limited to, a single processor, a plurality of processors, multiple homogenous cores, multiple heterogeneous cores, multiple Central Processing Units (CPUs) of different kinds, and so on. The one or more processors may be a general-purpose processor, such as a central processing unit (CPU), an application processor (AP), or the like, a graphics-only processing unit such as a graphics processing unit (GPU), a visual processing unit (VPU), and/or an Artificial Intelligence (AI)-dedicated processor such as a neural processing unit (NPU).

The controller 208 may be adapted to detect and track the objects in the physical space by processing the media received from the media acquisition devices (104a-104n) deployed to cover the various points of the physical space. The controller 208 may also execute or process the object detection and tracker 300 to detect and track the objects in the physical space. As depicted in FIG. 3, the object detection and tracker 300 includes an object detector 302, and an object tracker 304.

The object detector 302 may be adapted to detect the at least one object in the media received from each of the media acquisition devices (104a-104n) deployed in the various points of the physical space. The object detector 302 processes the received media using the custom training methods such as, a YOLO v4 training method, a computer vision (CV) method, and so on, and detects the at least one object in the media. The object tracker 304 may also be adapted to track the detected object in the physical space. The object tracker 304 includes a calibration module 304a, a matrix creation module 304b, a matrix multiplication module 304c, and a clustering module 304d for tracking the detected at least one object in the physical space as described previously.

The calibration module 304a is adapted to perform the calibration process described above. The calibration module 304a receives the media of the media acquisition device (for example, 104a) captured at the first point of the plurality of points for the pre-defined time period. The calibration module 304a detects the input data points of the media acquisition device 104a for the first point of the physical space. The calibration module 304a also processes the first and second bounding boxes of the at least one object from the media of the media acquisition device 104a captured at the first point of the physical space and creates the average bounding box by averaging the coordinates of the first and second bounding boxes. The calibration module 304a detects the pixel coordinates of the average bounding box as the input points of the media acquisition device 104a, which represents the at least one object present at the first point. The calibration module 304a projects the input data points of the media acquisition device 104a onto the ground plot as above.

Similarly, the calibration module 304a receives the media from the other media acquisition devices (104b-104n) captured at the respective coverage points of the physical space, detects the input data points of each other media acquisition device (104b-104n) for each respective coverage point, and projects the detected input data points of each other media acquisition device (104b-104n) onto the groundplot. The data points on the groundplot corresponding to the input data points of each media acquisition device may be the target data points for the corresponding media acquisition device. The calibration module 304a then provides information about the projection of the input data points of each media acquisition device (104a-104n) onto the groundplot to the matrix creation module 304b.

The matrix creation module 304b is adapted to create the projection matrix for each media acquisition device (104a-104n). The projection matrix created for the media acquisition device (104a-104n) acts as a bridge between the input data points derived for the media acquisition device at the particular points of the physical space and the target data points of the respective media acquisition device mapped onto the groundplot.

The matrix creation module 304b creates the projection matrix for each media acquisition device (104a-104n) based on the input matrix, and the output matrix of the respective media acquisition device (104a-104n), and the transpose matrix. The input matrix of the media acquisition device (104a-104n) includes the input data points of the media acquisition device (104a-104n). The output matrix of the media acquisition device (104a-104n) includes the target data points of the media acquisition device (104a-104n). The transpose matrix is the transpose of the input matrix of the media acquisition device (104a-104n). The matrix creation module 304b provides the created projection matrix for each media acquisition device (104a-104n) to the matrix multiplication module 304c.

The matrix multiplication module 304c performs the matrix multiplication to obtain the output data points for each media acquisition device (104a-104n) and visualizes/projects the continuous stream of the output data points of each media acquisition device (104a-104n) onto the groundplot. The visualization of the continuous stream of the output data points of each media acquisition device (104a-104n) on the groundplot may represent the data points of the same object strongly associated to each other on the groundplot. The matrix multiplication module 304c provides information about the visualization to the clustering module 304d.

The clustering module 304d may be adapted to form the cluster of data points by grouping the data points of the same object on the groundplot that have been strongly associated with each other. The clustering module 304d processes the visualization of the continuous stream of the input data points of each object on the groundplot using the K-means clustering method of the neural network and forms the cluster of data points for each object.

The neural network may comprise a plurality of layers. Each layer has a plurality of weight values and performs a layer operation through calculation of a previous layer and an operation of a plurality of weights/coefficients. Examples of the neural networks include at least one of, but not limited to, a convolutional neural network (CNN), a deep neural network (DNN), a recurrent neural network (RNN), a restricted Boltzmann Machine (RBM), a deep belief network (DBN), a bidirectional recurrent deep neural network (BRDNN), generative adversarial networks (GAN), a regression based neural network, a deep reinforcement model, a deep Q-network, and so on. The neural network may also include a plurality of nodes, which may be arranged in the layers. Examples of the layers may be, but are not limited to, a convolutional layer, an activation layer, an average pool layer, a max pool layer, a concatenated layer, a dropout layer, a fully connected layer, a SoftMax layer, and the like.

The neural network may be trained using at least one learning method to form the cluster of data points for each object. Examples of the learning method may be, but are not limited to, supervised learning, unsupervised learning, semi-supervised learning, reinforcement learning, regression-based learning, and so on. A function associated with the learning method may be performed through the non-volatile memory, the volatile memory, and the controller 208. The controller 208 may include one or a plurality of processors. At this time, one or a plurality of processors may be a general-purpose processor, such as a central processing unit (CPU), an application processor (AP), or the like, a graphics-only processing unit such as a graphics processing unit (GPU), a visual processing unit (VPU), and/or an Artificial Intelligence (AI)-dedicated processor such as a neural processing unit (NPU), and the like, or some combination thereof.

The controller 208 one or a plurality of processors may form the cluster of data points for each object, in accordance with pre-defined operating rules of the neural network stored in the non-volatile memory and the volatile memory. The predefined operating rules of the neural network are provided through training the neural network using the learning method. Here, being provided through learning means that, by applying the learning method to a plurality of learning data, a predefined operating rule or AI model of a desired characteristic is made. Forming the cluster of data points for each object may be performed in the detection and tracking device 102 itself in which the learning according to an embodiment is performed.

On forming the cluster of data points for each object, the clustering module 304d identifies the centroid of the cluster and assigns a tracking ID to the cluster. The centroid of the cluster may correspond to the object. The clustering module 304d assigns the tracking ID to the cluster, when the data points of the object on the groundplot appear near the vicinity of the entry point of the physical space or some other reference point.

Figure 4:
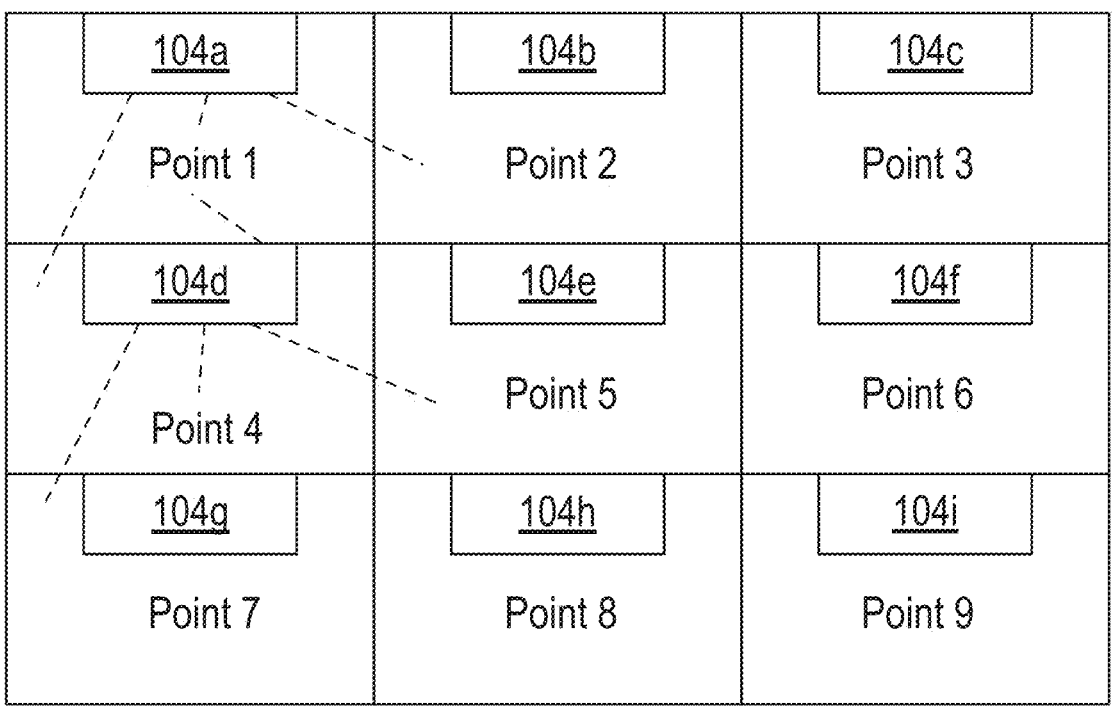
FIG. 4 is an example diagram depicting deployment of media acquisition devices in the physical space.

FIG. 4 is an example diagram depicting deployment of the media acquisition devices (104a-104n) in a physical space, according to embodiments as disclosed herein. The detection and tracking device 102 divides the entire area of the physical space into the plurality of points for example: points 1-9 as depicted. The detection and tracking device 102 allows an operator to deploy the media acquisition devices/camera (104a-104i) in the physical space to cover the at least three points among the nine points of the physical space. The media acquisition devices (104a-104i) may be deployed in the physical space by hinging the media acquisition devices (104a-104i) on the ceiling of the physical space to cover the at least three points of the points 1-9 as depicted. The media acquisition devices (104a-104i) may be positioned next to each other with the overlap between the adjacent media acquisition devices (104a-104i). In this example, the media acquisition device 104a covers the points 1, 2 and 4, and the media acquisition device 104d covers the points 1, 4, 7, and 5.

Figure 5:
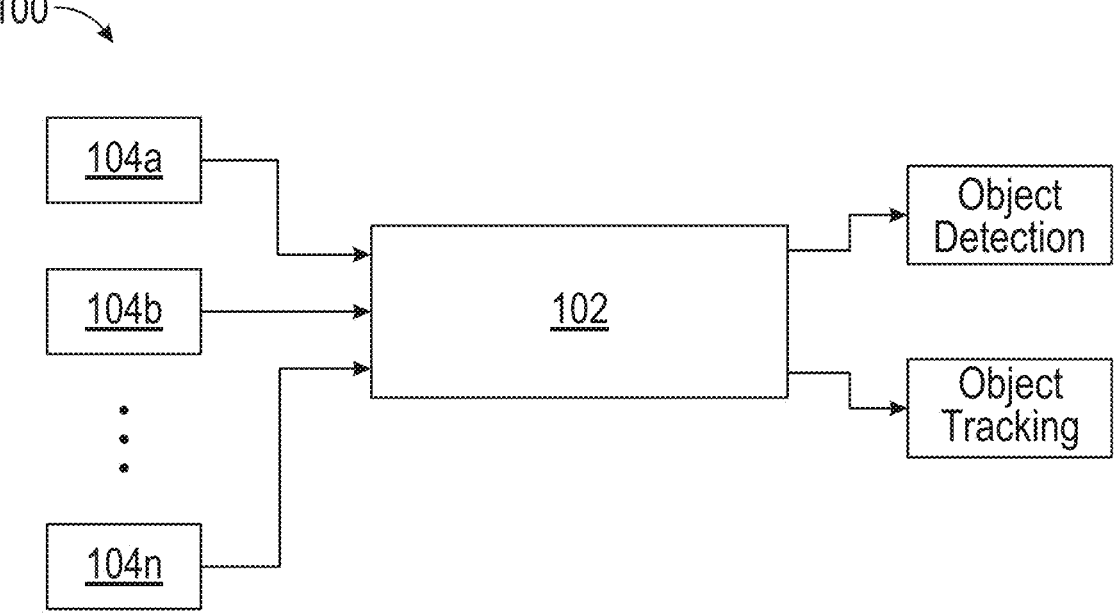
FIG. 5 is an example conceptual diagram depicting detection and tracking of the at least one object in the physical space.

FIG. 5 is an example conceptual diagram depicting detection and tracking of the at least one object in a physical space. The detection and tracking device 102 receives the media from the plurality of media acquisition devices (104a-104n) and detects the at least one object in the media received from each media acquisition device (104a-104n). The detection and tracking device 102 detects the at least one object in the media using the custom training methods described above, and tracks the detected at least one object by assigning the tracking ID to the at least one object.

Figure 6:
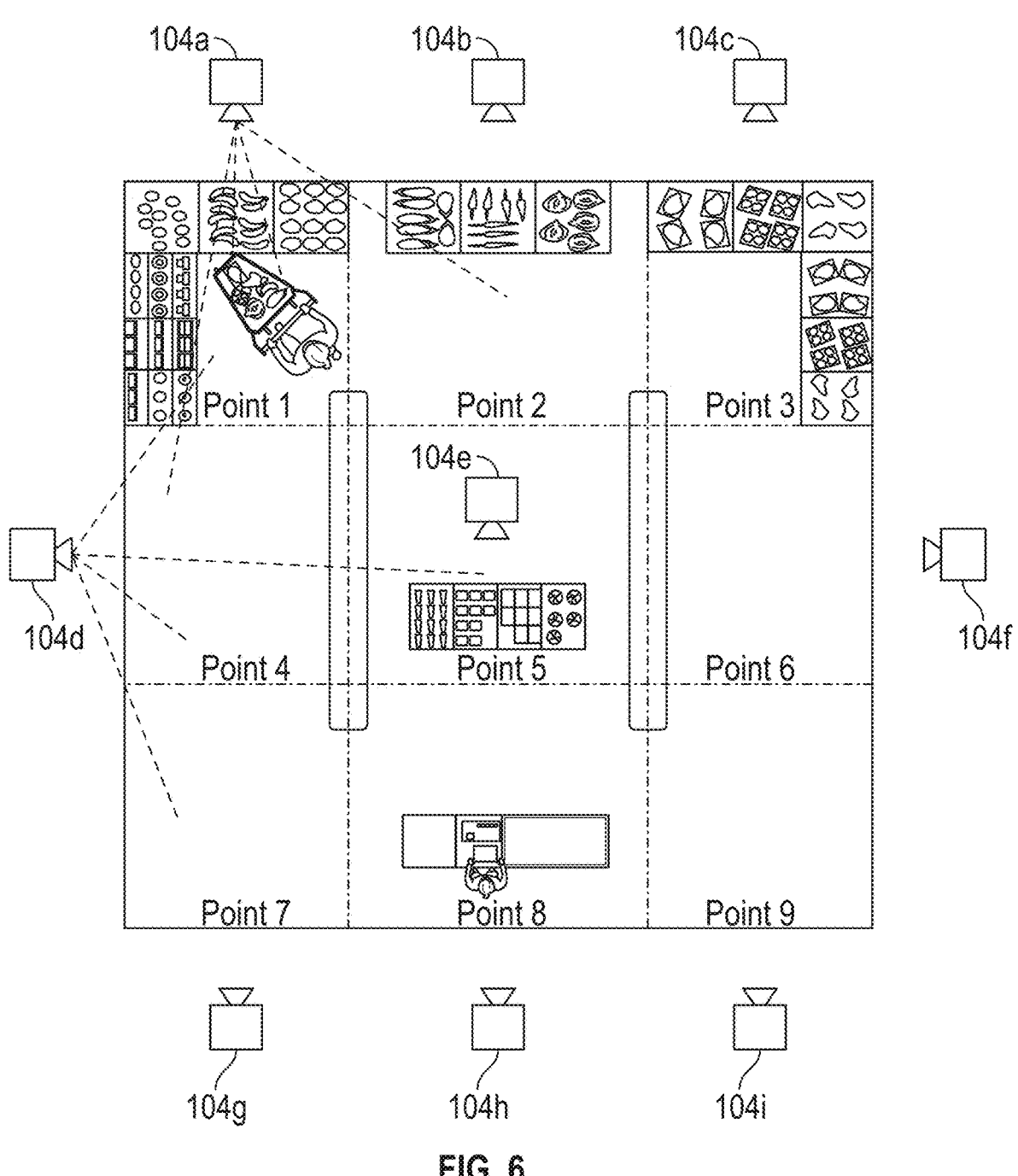
FIG. 6 is an example diagram depicting derivation of input data points of each media acquisition device capturing different points of the physical space.

Consider an example scenario, as depicted in FIG. 6, wherein the physical space is divided in a grid-like fashion into nine points, with the media acquisition devices (104a-104i) deployed in the physical space to each cover at least three points among the nine points of the physical space. In such a scenario for tracking the at least one object, the detection and tracking device 102 collects the media of a first point 1 from the media acquisition device 104a for 10 seconds, detecting customer "A" at the point 1. The detection and tracking device 102 determines the input data points of the media acquisition device 104a for the point 1. The input data points represent the pixel coordinates of customer A present at point 1. The detection and tracking device 102 collects the media from the other media acquisition devices (104b-104i) capturing the respective coverage points. For example, the detection and tracking device 102 collects the media from the media acquisition device 104d which captures the points 1, 4, 5, and 7. The detection and tracking device 102 determines the input data points of the media acquisition devices (104b-104i) with respect to their coverage points. The input data points of these other media acquisition devices (104b-104i) represent the object present at their respective coverage points.

Figure 7:
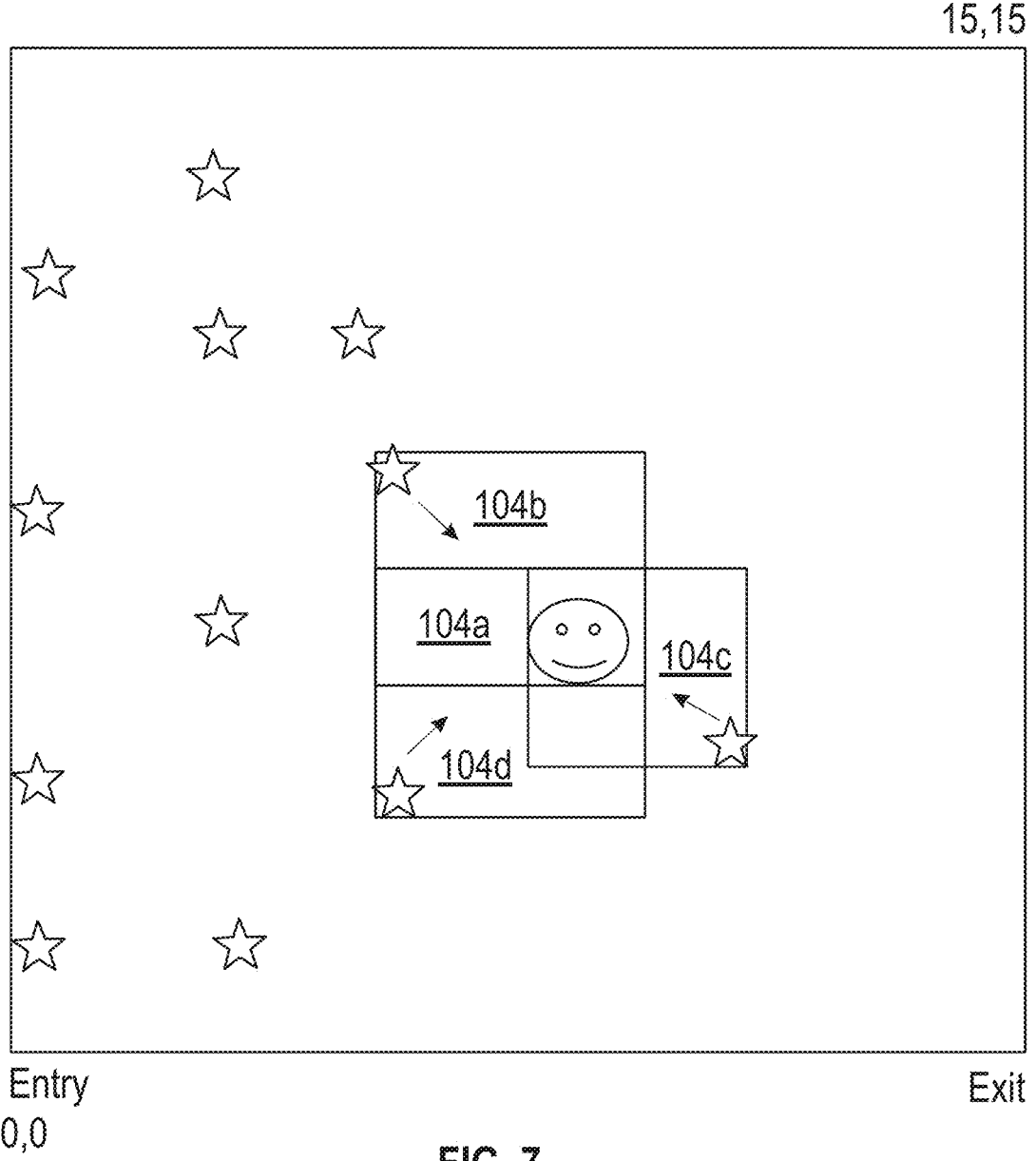
FIG. 7 is an example diagram depicting projection of the input data points of each media acquisition device on a groundplot.

The detection and tracking device 102 projects the input data points of the media acquisition devices (104a-104n) with respect to their coverage points on the groundplot, as depicted in FIG. 7. The input data points of the media acquisition devices 104a, 104b, 104d, and 104e depict the same customer A, as each of the media acquisition devices 104a, 104b, 104d, and 104e have point 1 in its respective field of view/coverage. Stars on the figure represent the various media acquisition device placements.

As before, the detection and tracking device 102 creates the projection matrix for each of the media acquisition devices (104a-104n) based on the input data points of the respective media acquisition device, the target data points on the groundplot corresponding to the input data points of the respective media acquisition device, and the transpose of the input data points of the respective media acquisition device. The detection and tracking device 102 then generates the output data points for each of the media acquisition devices (104a-104n) by performing the multiplication of the input data points of the respective media acquisition device with the projection matrix. The detection and tracking device 102 visualizes the output data points of each of the media acquisition devices (104a-104n) onto the ground plot, as depicted in FIG. 8. A groundplot visualization, as depicted in FIG. 8, represents the data points of the customer A, that have been strongly associated with each other. In this figure the physical space is divided into points in a grid-like fashion, with an entry waypoint near coordinates 2,0 and an exit waypoint near coordinates 10,0. The centroid is visible near coordinates 10,10.

Figure 9:
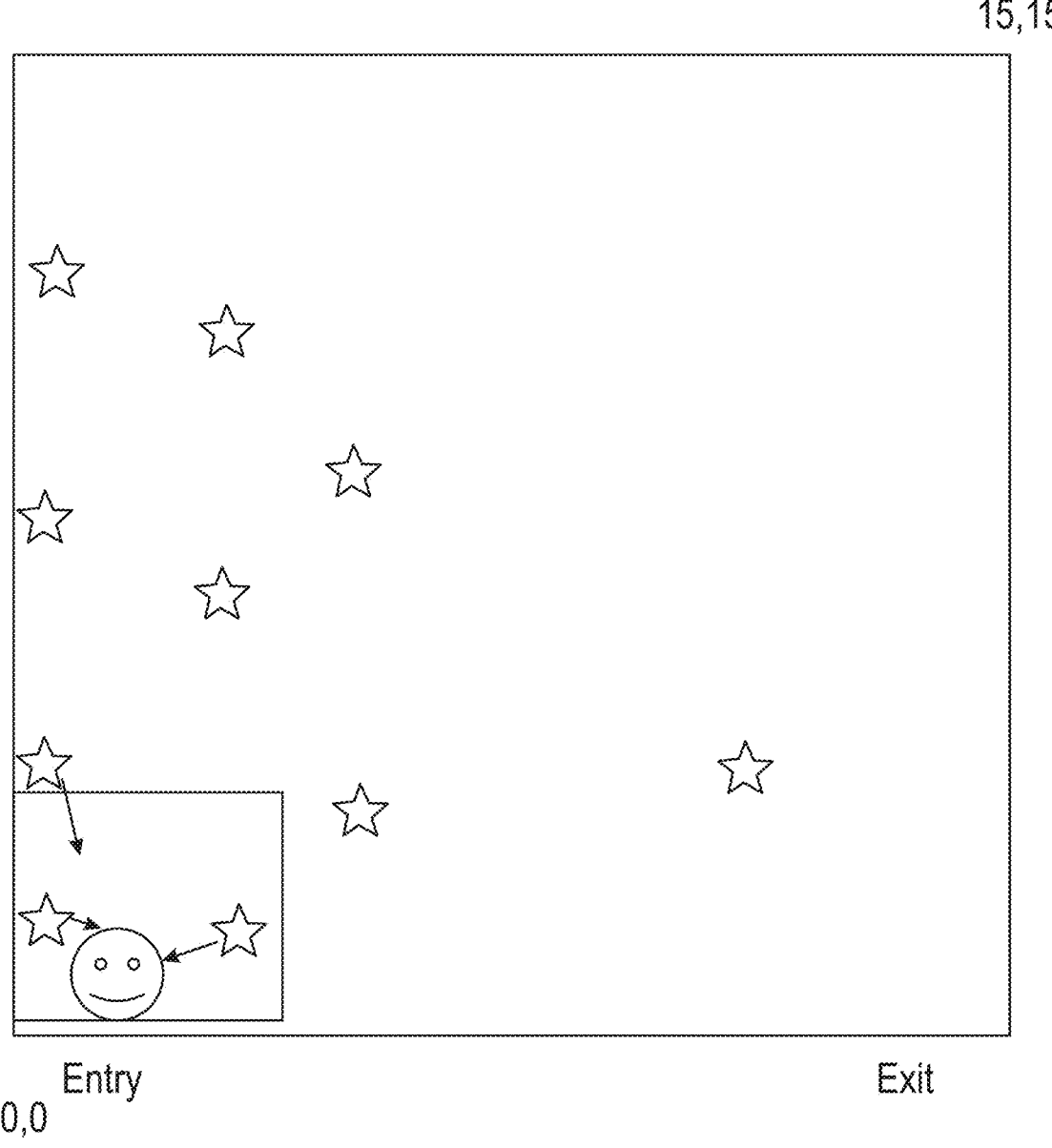
FIG. 9 is an example diagram depicting assigning of a tracking identifier (ID) to the at least one object.

On visualizing the output data points of each of the media acquisition devices (104a-104n) on the ground plot, the detection and tracking device 102 forms the cluster of the data points of the customer A and identifies the centroid of the cluster. The detection and tracking device 102 assigns the tracking ID to the centroid of the cluster, which represents the object. The detection and tracking device 102 assigns the tracking ID to the centroid of the cluster/object, when the data points of the customer A appear near the entry point of the physical space, as depicted in FIG. 9.

The detection and tracking device 102 may use the tracking ID of the customer A for tracking the customer A in the physical space (in this example a retail store), determine products picked up by the customer A, and auto-generate a bill for the customer A.

FIG. 10 is a flow diagram 1000 depicting a method for detecting and tracking the objects in the physical space, according to embodiments as disclosed herein.

At step 1002, the method includes detecting, by the detection and tracking device 102, the at least one object in the physical space, on receiving the media from the plurality of media acquisition devices (104a-104n) positioned in the physical space. The plurality of media acquisition devices (104a-104n) may be hinged on the ceiling of the physical space at the defined angle to cover the at least one point of the plurality of points of the physical space, wherein the at least one point represents a portion of the entire area of the physical space.

At step 1004, the method includes tracking, by the detection and tracking device 102, the at least one object in the physical space by projecting the input data points of each media acquisition device (104a-104n) onto the groundplot and clustering the input data points into the single cluster. The various actions in method 1000 may be performed in the order presented, in a different order or simultaneously. Further, in some embodiments, some actions listed in FIG. 10 may be omitted.

FIG. 11 is an example diagram 1100 depicting a method for projecting the input data points of each media acquisition device onto the groundplot, according to embodiments as disclosed herein. At step 1102, the method includes performing, by the detection and tracking device 102, the calibration process to find and correct significant distortion of the at least one object detected from the received media to the actual view. At step 1104, the method includes performing, by the detection and tracking device 102, the matrix multiplication on the input data points of each of the media acquisition device (104a-104n) with the associated projection matrix. The various actions in method 1100 may be performed in the order presented, in a different order or simultaneously. Further, in some embodiments, some actions listed in FIG. 11 may be omitted.

Figure 12:
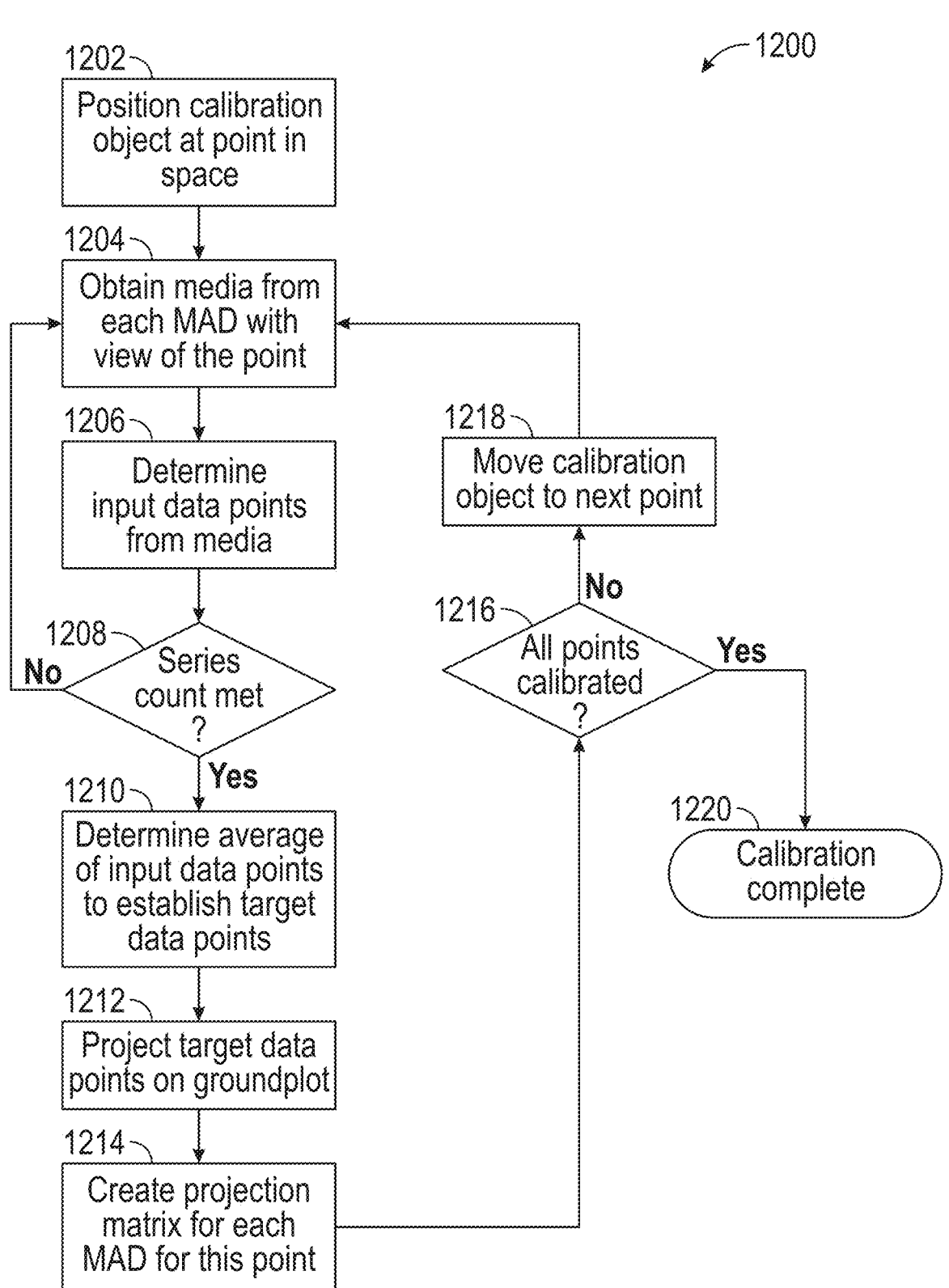
FIG. 12 is a flow diagram depicting a method for performing a calibration process.

FIG. 12 is a flow diagram 1200 depicting a method for performing the calibration process in a physical space that has been divided in a grid-like fashion with defined points within the space. At step 1202, a calibration object is placed at a first point in the physical space. The calibration object is typically a representation object to remove the variable of movement, but may also be a real object.

The detection and tracking device (102) obtains media from each media acquisition device (104a-104n) that covers this first point (1204). The input points are then determined from the media obtained (1206). This is repeated until the predefined media series count is met (1208). The detection and tracking device then determines an average of the input data points obtained from each media acquisition device covering this point to establish target data points for the respective media acquisition device (1210). These target data points are then projected onto the groundplot (1212) and a projection matrix for each respective media acquisition device is created (1214).

The projection matrix for each of the media acquisition devices (104a-104n) is determined as:

$$\text{projection matrix} = (O \cdot IT) \cdot INV(I \cdot IT)$$

wherein "I" is an input matrix depicting the input data points of the respective media acquisition device, "O" is an output matrix depicting target data points on the groundplot corresponding to the input data points of the respective media acquisition device, and "IT" is a transpose of the input matrix. The projection matrix created for each object acts as a bridge between the input data points of the respective media acquisition device and the associated target data points mapped onto the groundplot.

Once the first point calibration is complete, it is determined if any additional points remain (1216). The calibration object is moved to the next point (1218) and the process repeats as before for the media acquisition devices (104a-104n) that view the next point (1204-1214). Once all points in the physical space have been covered, and each media acquisition device has received a projection matrix for each point that the media acquisition device views, the calibration process is complete (1220).

FIG. 13 is a flow diagram 1300 depicting a method for performing the matrix multiplication, according to embodiments as disclosed herein. At step 1302, the method includes determining, by the detection and tracking device 102, the matrix multiplication of the input data points of the media acquisition device with the projection matrix of the media acquisition device.

At step 1304, the method includes generating, by the detection and tracking device 102, a groundplot visualization (as depicted in FIG. 8) by visualizing the continuous stream of the output data points of each media acquisition device onto the groundplot. The groundplot visualization indicates the data points of the at least one object on the groundplot that have been strongly connected with each other. The various actions in method 1300 may be performed in the order presented, in a different order, or simultaneously if the data stream allows. Further, in some embodiments, some actions listed in FIG. 13 may be omitted.

FIG. 14 is a flow diagram 1400 depicting a method for performing the clustering to assign the tracking ID for each object, according to embodiments as disclosed herein. At step 1402, the method includes forming, by the detection and tracking device 102, the cluster for each of the at least one object by grouping the data points of the same object that are strongly connected with each other.

At step 1404, the method includes identifying, by the detection and tracking device 102, the centroid of the cluster of each object. At step 1406, the method includes assigning, by the detection and tracking device 102, the tracking ID for the centroid of the cluster of each object for tracking each object in the physical space, wherein the centroid of the cluster corresponds to the associated object. The various actions in method 1400 may be performed in the order presented, in a different order, or simultaneously if the data stream allows. Further, in some embodiments, some actions listed in FIG. 14 may be omitted.

The embodiments disclosed herein may be implemented through at least one software program running on at least one hardware device and performing network management functions to control the elements. The elements shown in FIGS. 1a-3, may be at least one of a hardware device, or a combination of hardware device and software module.

As indicated above, aspects of this invention pertain to specific "method functions" implementable through various computer systems. In an alternate embodiment, the invention may be implemented as a computer program product for use with a computer system. Those skilled in the art should readily appreciate that programs defining the functions of the present invention can be delivered to a computer in many forms, which include, but are not limited to: (a) information permanently stored on non-writeable storage media (e.g. read only memory devices within a computer such as ROMs or CD-ROM disks readable only by a computer I/O attachment); (b) information alterably stored on writeable storage media (e.g. floppy disks and hard drives); or (c) information conveyed to a computer through communication media, such as a local area network, a telephone network, or a public network like the Internet. It should be understood, therefore, that such media, when carrying computer readable instructions that direct the method functions of the present invention, represent alternate embodiments of the present invention.

The invention may be embodied in other specific forms without departing from the essential characteristics thereof. The described embodiments are therefore to be considered in all respects as illustrative and not restrictive. Accordingly, the scope of the invention is established only by the appended claims rather than by the foregoing description. All changes coming within the meaning and range of equivalency of the claims are therefore intended to be embraced therein. Further, the recitation of method steps does not denote a limiting sequence for execution of the steps. Such method steps may therefore be performed in a sequence other than that recited unless the claim expressly states otherwise.

We claim:

1. A method for detecting and tracking objects in a physical space, the method steps comprising:

in a physical space comprising a plurality of media acquisition devices positioned therein, the space divided in an approximate grid fashion with defined points such that each media acquisition device senses three or more points within the space, detecting, by a detection and tracking device, at least one object of interest in the physical space by receiving media from the plurality of media acquisition devices;

processing each of the received media from each of the plurality of media acquisition devices using at least one custom training method;

deriving, from each of the received media, input data points for the object from a bounding box defined in the media corresponding with the object;

deriving, using a projection matrix for each of the media acquisition devices, output data points using a matrix multiplication with the input data points;

projecting the output data points onto the groundplot;

clustering the output data points to obtain a centroid representing the at least one object on the groundplot;

assigning a tracking ID to the centroid; and tracking, by the detection and tracking device, the at least one object in the physical space by repeating the previous steps.

2. The method of claim 1, the method steps additionally comprising:

performing a calibration process to determine the projection matrix, the calibration process steps comprising:

obtaining media from a first media acquisition device for a first point in the space where a calibration object is present and the first media acquisition device has a view of the first point;

deriving input data points by determining pixel coordinates of a bounding box for the calibration object within the media at the first point;

repeating the above steps for a predefined period of time to capture a predetermined number of input data points;

determining an average of the series of input data points to establish target data points projected onto the groundplot;

creating the projection matrix for the first media acquisition device; and repeating the previous calibration process steps for additional media acquisition devices having a view of the first point.

3. The method of claim 2, the calibration method steps additionally comprising:

positioning the calibration object at another point in the space; and repeating the calibration process steps for all media acquisition devices having a view of the another point, until all points have been addressed.

4. The method of claim 2, the method steps for determining the pixel coordinates of a bounding box additionally comprising:

identifying a first bounding box and a second bounding box from the received media of the media acquisition device, wherein the calibration object is enclosed in the first bounding box and the second bounding box;

creating an average bounding box by averaging coordinates of the first bounding box and the second bounding box; and deriving pixel coordinates of the average bounding box as the input data points of the media acquisition device.

5. The method of claim 1, the method steps additionally comprising:

training each of the plurality of media acquisition devices using at least one custom training method to detect and annotate the at least one object in the physical space.

6. The method of claim 1, the method steps for clustering the output data points of each media acquisition device additionally comprising:

generating the groundplot visualization by projecting a continuous stream of the output data points of each media acquisition device onto the groundplot;

forming, using a k-means clustering method, the cluster for the object by grouping the data points of the object that are strongly connected with each other; and identifying the centroid of the cluster.

7. The method of claim 1, the method steps additionally comprising:

assigning the tracking ID to the at least one object of interest on detecting the centroid of the object as it appears near a reference point of the physical space.

8. A system for detecting and tracking objects in a physical space, the system comprising:

a plurality of media acquisition devices positioned within a physical space, the space divided in an approximate grid fashion with defined points such that each media acquisition device is adapted to sense three or more points within the space; and a detection and tracking device in communication with the plurality of media acquisition devices, the detection and tracking device adapted to perform the processing steps comprising:

receiving media from the plurality of media acquisition devices;

processing each of the received media from each of the plurality of media acquisition devices using at least one custom training method;

deriving, from each of the received media, input data points for the object from a bounding box defined in the media corresponding with the object;

deriving, using a projection matrix for each of the media acquisition devices, output data points using a matrix multiplication with the input data points;

projecting the output data points onto the groundplot;

clustering the output data points to obtain a centroid representing the at least one object on the groundplot;

assigning a tracking ID to the centroid; and tracking, by the detection and tracking device, the at least one object in the physical space by repeating the previous processing steps.

9. The system of claim 8, the processing steps additionally comprising:

performing a calibration process to determine the projection matrix, the calibration process steps comprising:

obtaining media from a first media acquisition device for a first point in the space where a calibration object is present and the first media acquisition device has a view of the first point;

deriving input data points by determining pixel coordinates of a bounding box for the calibration object within the media at the first point;

repeating the above steps for a predefined period of time to capture a predetermined number of input data points;

determining an average of the series of input data points to establish target data points projected onto the groundplot;

creating the projection matrix for the first media acquisition device; and repeating the previous calibration process steps for additional media acquisition devices having a view of the first point.

10. The system of claim 9, the calibration process steps additionally comprising:

positioning the calibration object at another point in the space; and repeating the calibration process steps for all media acquisition devices having a view of the another point, until all points have been addressed.

11. The system of claim 9, the processing steps for determining the pixel coordinates of a bounding box additionally comprising:

identifying a first bounding box and a second bounding box from the received media of the media acquisition device, wherein the calibration object is enclosed in the first bounding box and the second bounding box;

creating an average bounding box by averaging coordinates of the first bounding box and the second bounding box; and deriving pixel coordinates of the average bounding box as the input data points of the media acquisition device.

12. The system of claim 8, the processing steps additionally comprising:

training each of the plurality of media acquisition devices using at least one custom training method to detect and annotate the at least one object in the physical space.

13. The system of claim 8, the processing steps for clustering the output data points of each media acquisition device additionally comprising:

generating the groundplot visualization by projecting a continuous stream of the output data points of each media acquisition device onto the groundplot;

forming, using a k-means clustering method, the cluster for the object by grouping the data points of the object that are strongly connected with each other; and identifying the centroid of the cluster.

14. The system of claim 8, the processing steps additionally comprising:

assigning the tracking ID to the at least one object of interest on detecting the centroid of the object as it appears near a reference point of the physical space.

* * * * *